(No Model.)
W. BOWKER.
BAND SAW GUIDE.
No. 259,661. Patented June 20, 1882.
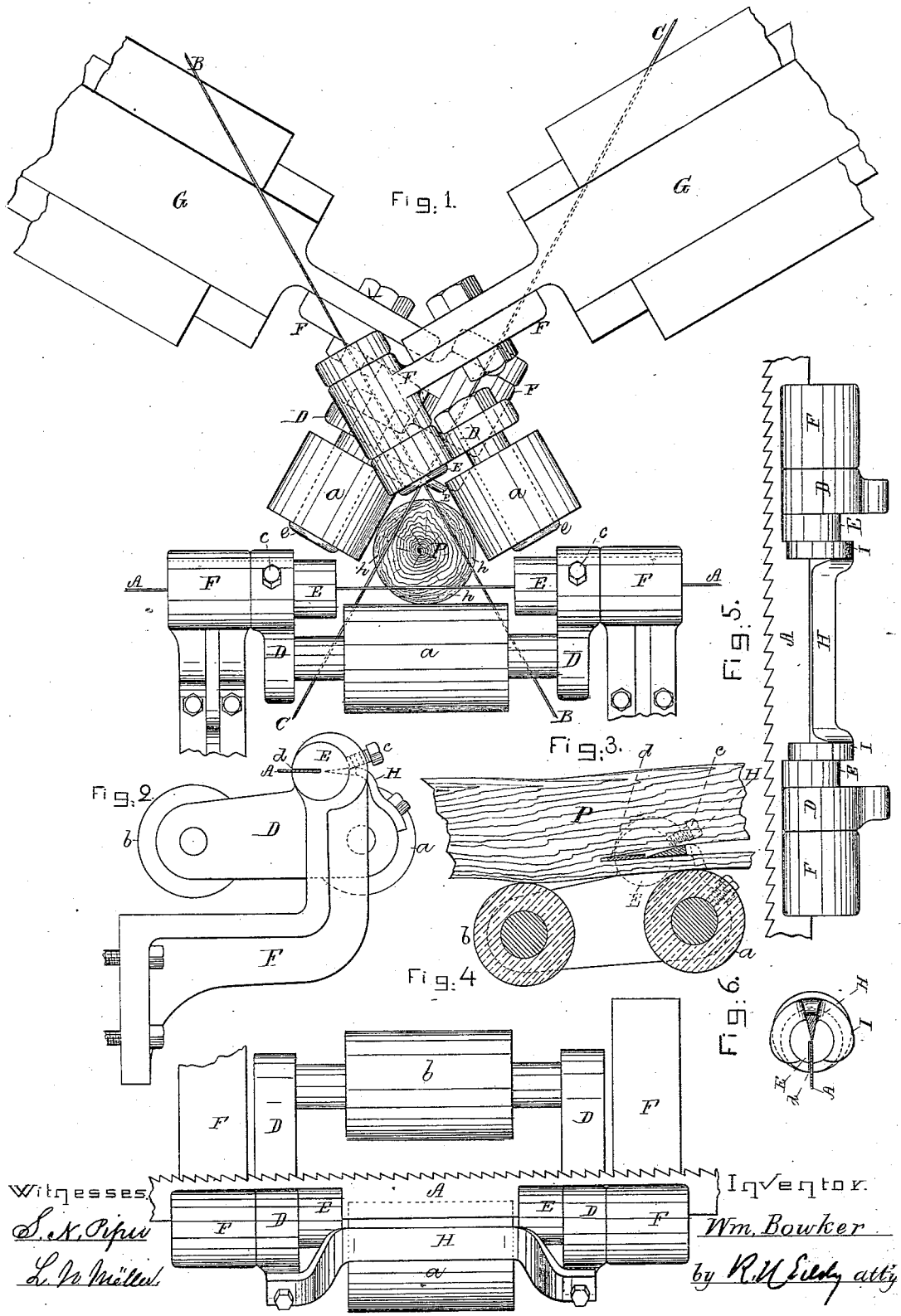

UNITED STATES PATENT OFFICE.

WILLIAM BOWKER, OF SOMERVILLE, ASSIGNOR TO HIMSELF AND ROBERT WILLIAMS, OF BOSTON, MASSACHUSETTS.

BAND-SAW GUIDE.

SPECIFICATION forming part of Letters Patent No. 259,661, dated June 20, 1882.

Application filed April 10, 1882. (No model.)

*To all whom it may concern:*

Be it known that I, WILLIAM BOWKER, a subject of the Queen of Great Britain, and a resident of Somerville, in the county of Middlesex, of the State of Massachusetts, have invented a new and useful Improvement in Machinery for Sawing Barrel-Hoops from Poles; and I do hereby declare the same to be described in the following specification and represented in the accompanying drawings, of which—

Figure 1 is an elevation of parts of three band-saws provided with my improved mechanism for guiding each and bending it laterally to cause it to cut into the pole a kerf in parallelism, or about so, with the surface which may be borne along against the pressure-roller. Fig. 2 is an end view of the saw guiding and holding mechanism and one of its supporting-brackets. Fig. 3 is a longitudinal section, and Fig. 4 a top view, of such saw guiding and bending mechanism. Fig. 5 is a top view, and Fig. 6 a transverse section, of one of the band-saws and its kerf-opener, these said figures showing a different mode of applying the kerf-opener to that represented in Figs. 3 and 4.

The nature of my invention is defined in the claims hereinafter presented.

In Fig. 1 of the drawings, A, B, and C represent parts of three endless band-saws as arranged for sawing from a pole, P, three hoops, $h\ h\ h$. Each hoop portion of the pole while the pole is being fed to the saws bears against the two rollers of one of three sets of pressure-rollers, $a$ and $b$. The arrangement of the rollers $a$ to the pole is shown in Fig. 1, in which, however, the rollers $b$ are not represented, they being in rear of the rollers $a$, as shown in Figs. 2, 3, and 4, in which the horizontal roller $a$ and its fellow roller $b$ are exhibited as arranged within and supported by two swinging levers, D D, each of which is provided with one of two journals, E. The journal to each of the said levers D extends through and projects from it in opposite directions, and is secured to the lever by a set-screw, $c$. These journals rest and turn in stationary brackets F, and each of them is grooved lengthwise throughout it to receive within it a saw, in manner as represented in the drawings, the groove for so receiving the saw being shown at $d$ in Figs. 2, 3, and 6.

Each of the two upper inclined rollers, $a$, and its fellow $b$, are supported on journals $e$ projecting from a single swinging lever, D, projecting from and fastened to a cylindrical journal, E, having its bearing in a bracket, F. The said bracket projects from a slider, G, which in practice is provided with a spring to force it forward and allow it to move backward. By means of this spring the pressure-roller $a$ and its fellow $b$ are forced up against the hoop portion of the pole while the pole is being advanced and sawed. By the pressure downward upon the pole by the two upper sets of pressure-rollers, $a\ b$, the pole is borne down upon the horizontal set $a\ b$.

As the pole may advance each saw will, by being in its groove $d$, be maintained at one uniform distance from its two guide-rollers, $a\ b$; but as the surface against which these rollers may bear may be more or less winding or sinuous, the lever or levers D supporting such rollers will be vibrated so as to cause the grooved journal of each of such levers to turn more or less, so as to bend the saw laterally into parallelism with each sinuosity, in order to cause it to cut the hoop so that its inner side may be substantially parallel to the longitudinal median line of its outer surface.

In Fig. 3 the hoop-pole P is shown in its relation to the two roller $a\ b$, the saw, and the kerf-section.

From the above it will be seen that, however irregular in diameter or knotty the hoop-pole may be, the two rollers $a\ b$ and their supporting lever or levers D and the grooved journal of each of such levers will not only cause the hoop-pole to be cut with a uniform thickness along its median line, but will tip or bend the saw laterally, as occasion may require, to cause it to maintain its parallelism with the said longitudinal median line of the outer surface of the hoop.

In rear of the saw-groove $d$ is the saw-kerf opener H, which is wedge-shaped transversely, and is supported by being fastened to a lever, D, or, as shown in Fig. 4, to two of them. As the pole may advance the kerf-opener H will pass into the kerf made by the saw and spread it a little to prevent the saw from binding in the kerf and to allow of the saw being bent laterally therein as may be required.

In Figs. 5 and 6 the kerf opener or spreader H is shown as supported by clasps I I, encompassing in part, as shown, the journals E.

What I claim as my invention in the hoop-pole-sawing machine is as follows, viz:

1. In combination with the band-saw, mechanism, substantially as described, for guiding it and bending it laterally, in order to cause it to cut in a pole a kerf in parallelism with the median longitudinal line of the surface of the hoop or portion separated by it from the pole, such mechanism consisting of the two rollers $a\ b$, their sustaining lever or levers D, and the grooved journal E to each of such levers, all being arranged with the saw and applied substantially as set forth.

2. The combination of the kerf spreader or opener H with the saw and the mechanism for guiding it and bending it laterally, such mechanism consisting of the grooved journal E, its carrying-lever D, and its pressure-rollers $a\ b$, all being arranged, applied, and operated essentially as set forth.

WILLIAM BOWKER.

Witnesses:
R. H. EDDY,
E. B. PRATT.